United States Patent [19]

Dankosh

[11] Patent Number: 5,510,236
[45] Date of Patent: Apr. 23, 1996

[54] SPECTRALLY SENSITIZED PHOTOTHERMOGRAPHIC ELEMENTS

[75] Inventor: Heidi E. Dankosh, Rochester, N.Y.

[73] Assignee: Eastman Kodak Company, Rochester, N.Y.

[21] Appl. No.: 440,406

[22] Filed: May 12, 1995

[51] Int. Cl.$^6$ .................................. G03C 1/498
[52] U.S. Cl. .................. 430/619; 430/581; 430/583; 430/585; 430/617
[58] Field of Search .................. 430/587, 619, 430/585, 617, 583, 584, 586–595, 576, 581, 607, 965

[56] References Cited

U.S. PATENT DOCUMENTS

| | | |
|---|---|---|
| 3,457,075 | 7/1969 | Morgan et al. . |
| 3,719,495 | 3/1973 | Lea . |
| 3,761,279 | 9/1973 | de Mauriac et al. . |
| 3,877,943 | 4/1975 | Masuda . |
| 4,110,116 | 8/1978 | Beretta et al. . |
| 4,156,611 | 5/1979 | Ikenoue et al. . |
| 4,461,828 | 7/1984 | Metz et al. . |
| 4,476,220 | 10/1984 | Penfound ............... 430/569 |
| 4,784,939 | 11/1988 | Van Pham ............... 430/619 |
| 5,192,653 | 3/1993 | Tani ...................... 430/570 |
| 5,194,361 | 3/1993 | Taguchi . |
| 5,393,654 | 2/1995 | Burrows et al. . |

OTHER PUBLICATIONS

Hayashi et al, "Spectral Sensitization of Thermally Processed Silver Film by Cyanine Dyes", IMAGING SCIENCE, 33, 124 (1989).

*Primary Examiner*—Thorl Chea
*Attorney, Agent, or Firm*—Alfred P. Lorenzo

[57] ABSTRACT

Improved photothermographic elements are spectrally sensitized with cyanine dyes that provide efficient sensitization together with excellent keeping stability and low dye stain. The photothermographic elements comprise a photosensitive silver halide, an organic silver salt, such as silver behenate, and a reducing agent. The cyanine dye utilized as a spectral sensitizer for the silver halide is an anionic cyanine dye comprising two thiazole nuclei each of which is substituted with an N-sulfoalkyl group wherein at least one of the thiazole nuclei is a 5,6-dihalobenzothiazole nucleus.

18 Claims, No Drawings

SPECTRALLY SENSITIZED PHOTOTHERMOGRAPHIC ELEMENTS

CROSS-REFERENCE TO RELATED APPLICATIONS

Copending commonly-assigned U.S. patent application Ser. No. 44,405, filed May 12, 1995, "PHOTOTHERMOGRAPHIC ELEMENTS CONTAINING A COMBINATION OF SPECTRAL SENSITIZERS" by Heidi E. Dankosh describes photothermographic elements wherein the photosensitive silver halide is spectrally sensitized with a combination of a cyanine dye containing two thiazole nuclei and a cyanine dye containing a thiazole nucleus and an oxazole nucleus.

FIELD OF THE INVENTION

This invention relates in general to photothermography and in particular to novel spectrally sensitized photothermographic elements. More specifically, this invention relates to improved spectrally sensitized photothermographic elements with excellent keeping stability and low dye stain.

BACKGROUND OF THE INVENTION

Thermally processable imaging elements, including films and papers, for producing images by thermal processing are well known. These elements include photothermographic elements in which an image is formed by imagewise exposure to light followed by development by uniformly heating the element. Such elements typically include photosensitive silver halide, prepared in situ and/or ex situ, as a photosensitive component, in combination with an oxidation-reduction image forming combination, such as silver behenate with a phenolic reducing agent. Such elements are described in, for example, *Research Disclosure*, June, 1978, Item No. 17029, U.S. Pat. Nos. 3,457,075; and 3,933,508.

Photothermographic elements are typically processed by a method which comprises imagewise exposure of the element to actinic radiation to form a latent image therein followed by heating of the imagewise-exposed element to convert the latent image to a visible image. The simplicity of this method is highly advantageous. However, photothermographic elements are subject to several limitations which restrict their usefulness, including concerns relating to keeping stability and dye stain.

Silver halides have an intrinsic spectral sensitivity to blue light. Photographic emulsions can be spectrally sensitized to other wavelengths through the process of spectral sensitization with spectral sensitizing dyes. The spectral sensitivity corresponds to the absorption spectrum of the absorbed spectral sensitizing dye. The absorption spectrum is determined by the chemical substituents of the dye.

Photothermographic elements have been described heretofore in numerous patents, many of which teach the use of spectral sensitizing dyes. Examples of such spectral sensitizing dyes include the cyanine dyes of U.S. Pat. Nos. 3,457,075, 3,719,495, 3,761,279, 3,877,943, 4,156,611, 44,461,828 and 5,393,654. There is, however, still a critical need in the art for improved photothermographic elements utilizing spectral sensitizing dyes with enhanced performance characteristics.

There are a number of serious problems associated with the current use of spectral sensitizing dyes in photothermographic elements. Thus, for example, many sensitizing dyes spectrally sensitize over broad bandwidths but with a relatively low degree of spectral sensitivity. The low spectral sensitivity of these dyes necessitates the use of relatively large silver halide grains to achieve photographically useful speeds. However, large grains tend to cause excessive visual Dmin due to light scattering. This problem can be avoided by the use of finer grains, but then a more efficient spectral sensitizer is needed to prevent a corresponding speed loss. A further problem is that spectral sensitizing dyes can cause undesirable dye stain in the processed element. Both excellent keeping stability and low dye stain are desired in addition to efficient spectral sensitization.

It is toward the objective of providing improved photothermographic elements, sensitized with spectral sensitizing dyes that combine highly efficient sensitization with excellent keeping stability and low dye stain, that the present invention is directed.

SUMMARY OF THE INVENTION

In accordance with this invention, a photothermographic element is comprised of a support bearing one or more layers comprising:

(a) a photosensitive silver halide, prepared in situ or ex situ, (b) an organic silver salt; and (c) a reducing agent;

in concentrations such that imagewise exposure to actinic radiation generates from the silver halide a catalyst which accelerates an image-forming reaction between the organic silver salt and the reducing agent; wherein the photosensitive silver halide is spectrally sensitized with an anionic cyanine dye comprising two thiazole nuclei each of which is substituted with an N-sulfoalkyl group, with the proviso that at least one of the thiazole nuclei is a 5,6-dihalobenzothiazole nucleus.

Preferred anionic cyanine dyes for use in this invention are those comprising two benzothiazole nuclei each of which is substituted with an N-sulfoalkyl group of 2 to 6 carbon atoms and at least one of which is a 5,6-dichlorobenzothiazole nucleus.

As a result of having a sulfoalkyl group attached to the nitrogen atom of each thiazole nucleus, the cyanine dye that is utilized in this invention is rendered anionic and requires a positive counterion to balance the charge of the dye molecule.

Particularly preferred anionic cyanine dyes for use in this invention are carbocyanine dyes of the formula:

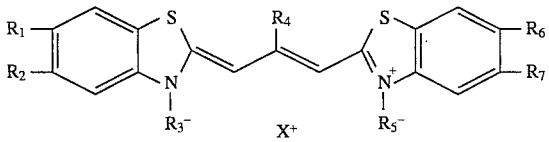

wherein:

$R_1$, $R_2$, $R_6$ and $R_7$ are, independently, hydrogen, halo, alkyl, alkoxy, aryl, aryloxy, heteroaryl, cyano, carboxy or hydroxy;

$R_3^-$ and $R_5^-$ are, independently, sulfoalkyl of 2 to 6 carbon atoms;

$R_4$ is hydrogen or alkyl of 1 to 4 carbon atoms; and $X^+$ is a positive counterion such as, for example, $Na^+$, $K^+$, $(C_2H_5)_3NH^+$, or the tetramethylguanadinium ion ($TMGH^+$); with the proviso that at least one of the benzothiazole nuclei is a 5,6-dihalobenzothiazole nucleus and preferably a 5,6-dichlorobenzothiazole nucleus.

The anionic cyanine dyes of this invention preferably sensitize the photothermographic element so that the wavelength of maximum spectral sensitivity is from about 625 to 650 nm. In addition to providing efficient sensitization, they provide excellent keeping stability and low dye stain. Exposure of the photothermographic element is preferably conducted with a HeNe laser emitting at 633 nm or a solid state laser emit ting in the range of 625–640 nm.

DESCRIPTION OF THE PREFERRED EMBODIMENTS

The photothermographic elements utilized in this invention can be black-and-white imaging elements or dye-forming elements, including elements adapted for dye image transfer to an image receiver layer. Illustrative of the many patents describing photothermographic elements are U.S. Pat. Nos. 3,457,075, 3,764,329, 3,802,888, 3,839,049, 3,871,887, 3,933,508, 4,260,667, 4,267,267, 4,281,060, 4,283,477, 4,287,295, 4,291,120, 4,347,310, 4,459,350, 4,741,992, 4,857,439 and 4,942,115.

The photothermographic elements as described in the prior art comprise a variety of supports. Examples of useful supports include poly(vinylacetal) film, polystyrene film, poly(ethyleneterephthalate) film, polycarbonate films and related films and resinous materials, as well as glass, paper, metal, and other supports that can withstand the thermal processing temperatures.

The layers of the photothermographic element are coated on the support by coating procedures known in the photographic art, including dip coating, air knife coating, curtain coating or extrusion coating using coating hoppers. If desired, two or more layers are coated simultaneously.

Commonly utilized photothermographic elements comprise a support bearing, in reactive association, in a binder, such as poly(vinyl butyral), (a) photosensitive silver halide, prepared ex situ and/or in situ, and (b) an oxidation-reduction image-forming combination comprising (i) an organic silver salt oxidizing agent, preferably a silver salt of a long chain fatty acid, such as silver behenate, with (ii) a reducing agent for the organic silver salt oxidizing agent, preferably a phenolic reducing agent. The photothermographic silver halide element can comprise other addenda known in the art to help in providing a useful image, such as optional toning agents and image stabilizers.

A preferred photothermographic element comprises a support bearing, in reactive association, in a binder, particularly a poly(vinyl butyral) binder, (a) photographic silver halide, prepared in situ and/or ex situ, (b) an oxidation-reduction image forming combination comprising (i) silver behenate, with (ii) a phenolic reducing agent for the silver behenate, (c) a toning agent, such as succinimide, and (d) an image stabilizer, such as 2-bromo-2-(4-methylphenylsulfonyl)acetamide.

The photothermographic element typically has an overcoat layer that helps protect the element from undesired marks. Such an overcoat can be, for example, a polymer as described in the photothermographic art. Such an overcoat can also be an overcoat comprising poly(silicic acid) and poly(vinyl alcohol) as described in U.S. Pat. No. 4,741,992.

The optimum layer thickness of the layers of the photothermographic element depends upon such factors as the processing conditions, thermal processing means, particular components of the element and the desired image. The layers typically have a layer thickness within the range of about 1 to about 10 microns.

The photothermographic element comprises a photosensitive component that consists essentially of photographic silver halide. In the photothermogaphic element it is believed that the latent image silver from the photographic silver halide acts as a catalyst for the described oxidation-reduction image-forming combination upon processing. A preferred concentration of photographic silver halide is within the range of about 0.01 to about 10 moles of silver halide per mole of silver behenate in the photothermographic element. Other photosensitive silver salts are useful in combination with the photographic silver halide if desired. Preferred photographic silver halides are silver chloride, silver bromide, silver bromoiodide, silver chlorobromoiodide and mixtures of these silver halides. Very fine grain photographic silver halide is especially useful. The photographic silver halide can be prepared by any of the procedures known in the photographic art. Such procedures for forming photographic silver halide are described in, for example, *Research Disclosure*, December 1978, Item No. 17643 and *Research Disclosure*, June 1978, Item No. 17029. Tabular grain photosensitive silver halide is also useful, such as described in, for example, U.S. Pat. No. 4,453,499.

The photographic silver halide can be unwashed or washed, chemically sensitized, protected against production of fog and stabilized against loss of sensitivity during keeping as described in the above Research Disclosure publications. The silver halide can be prepared in situ as described in, for example, U.S. Pat. No. 3,457,075. Optionally the silver halide can be prepared ex situ as known in the photographic art.

The photothermographic element typically comprises an oxidation-reduction image-forming combination that contains an organic silver salt oxidizing agent, preferably a silver salt of a long-chain fatty acid. Such organic silver salt oxidizing agents are resistant to darkening upon illumination. Preferred organic silver salt oxidizing agents are silver salts of long-chain fatty acids containing 10 to 30 carbon atoms. Examples of useful organic silver oxidizing agents are silver behenate, silver stearate, silver oleate, silver laurate, silver caprate, silver myristate, and silver palmitate. Combinations of organic silver salt oxidizing agents are also useful. Examples of useful silver salt oxidizing agents that are not silver salts of fatty acids include, for example, silver benzoate and silver benzotriazole.

The optimum concentration of organic silver salt oxidizing agent in the photothermographic material will vary depending upon the desired image, particular organic silver salt oxidizing agent, particular reducing agent, particular fatty acids in the photothermographic composition, and the particular photothermographic element. A preferred concentration of organic silver salt oxidizing agent is typically within the range of 0.5 mole to 0.90 mole per mole of total silver in the photothermographic element. When combinations of organic silver salt oxidizing agents are present, the total concentration of organic silver salt oxidizing agents is within the described concentration range.

A variety of reducing agents are useful in the oxidation-reduction image-forming combination. Examples of useful reducing agents include substituted phenols and naphthols such as bis-beta-naphthols; polyhydroxybenzenes, such as hydroquinones; catechols and pyrogallols, aminophenol reducing agents, such as 2,4-diaminophenols and methylaminophenols, ascorbic acid, ascorbic acid ketals and other ascorbic acid derivatives; hydroxylamine reducing agents; 3-pyrazolidone reducing agents; sulfonamidophenyl reducing agents such as described in U.S. Pat. No. 3,933,508 and *Research Disclosure*, June 1978, Item No. 17029. Combinations of organic reducing agents are also useful.

Preferred organic reducing agents in the photothermographic materials are sulfonamidophenol reducing agents, such as described in U.S. Pat. No. 3,801,321. Examples of useful sulfonamidophenol reducing agents include 2,6-dichloro-4-benzenesulfonamidophenol; benzenesulfonamidophenol; 2,6-dibromo-4-benzenesulfonamidophenol and mixtures thereof.

An optimum concentration of reducing agent in a photothermographic material varies depending upon such factors as the particular photothermographic element, desired image, processing conditions, the particular organic silver salt oxidizing agent and manufacturing conditions for the photothermographic material. A particularly useful concentration of organic reducing agent is within the range of 0.2 mole to 2.0 mole of reducing agent per mole of silver in the phtotothermographic material. When combinations of organic reducing agents are present, the total concentration of reducing agents is preferably within the described concentration range.

The photothermographic material preferably comprises a toning agent, also known as an activator-toning agent or a toner-accelerator. Combinations of toning agents are useful in photothermographic materials. An optimum toning agent or toning agent combination depends upon such factors as the particular photothermographic material, desired image and processing conditions. Examples of useful toning agents and toning agent combinations include those described in, for example, *Research Disclosure,* June 1978, Item No. 17029 and U.S. Pat. No. 4,123,282. Examples of useful toning agents include phthalimide, N-hydroxyphthalimide, N-potassium phthalimide, succinimide, N-hydroxy-1,8-naphthalimide, phthalazine, 1-(2H)-phthalazinone and 2-acetyphthalazinone.

Stabilizers are also useful in the photothermographic material. Examples of such stabilizers and stabilizer precursors are described in, for example, U.S. Pat. Nos. 4,459,350 and 3,877,940. Such stabilizers include photolytically active stabilizers and stabilizer precursors, azole thioethers and blocked azolinethione stabilizer precursors and carbamoyl stabilizer precursors.

Photothermographic materials preferably contain various colloids and polymers, alone or in combination, as vehicles or binding agents utilized in various layers. Useful materials are hydrophobic or hydrophilic. They are transparent or translucent and include both naturally occurring substances such as proteins, for example, gelatin, gelatin derivatives, cellulose derivatives, polysaccharides, such as dextran, gum arabic and the like; and synthetic polymeric substances, such as polyvinyl compounds like poly(vinylpyrrolidone) and acrylamide polymers. Other synthetic polymeric compounds that are useful include dispersed vinyl compounds such as in latex form and particularly those that increase the dimensional stability of photographic materials. Effective polymers include polymers of alkylacrylates and methacrylates, acrylic acid, sulfoacrylates and those that have crosslinking sites that facilitate hardening or curing. Preferred high molecular weight polymers and resins include poly(vinylbutyral), cellulose acetate butyrals, poly(methylmethacrylate), poly(vinyl pyrrolidone), ethyl cellulose, polystyrene, poly(vinyl chloride), chlorinated rubbers, polyisobutylene, butadiene-styrene copolymers, vinyl chloride-vinyl acetate copolymers, poly(vinyl alcohols) and polycarbonates.

The photothermographic materials can contain development modifiers that function as speed increasing compounds, sensitizing dyes, hardeners, antistatic layers, plasticizers and lubricants, coating aids, brighteners, absorbing and filter dyes, and other addenda, such as described in *Research Disclosure,* June 1978, Item No. 17029 and *Research Disclosure,* December 1978, Item No. 17643.

A photothermographic element, as described, also preferably comprises a thermal stabilizer to help stabilize the photothermographic element prior to imagewise exposure and thermal processing. Such a thermal stabilizer aids improvement of stability of the photothermographic element during storage. Typical thermal stabilizers are: (a) 2-bromo-2-arylsulfonylacetamides, such as 2-bromo-2-p-tolylsulfonylacetamide; (b) 2-(tribromomethyl sulfonyl)benzothiazole and (c) 6-substituted-2,4-bis(tribromomethyl)-S-triazine, such as 6-methyl or 6-phenyl-2,4-bis(tribromomethyl)-s-triazine.

Heating means known in the photothermographic art are useful for providing the desired processing temperature. The heating means is, for example, a simple hot plate, iron, roller, heated drum, microwave heating means, heated air or the like.

Thermal processing is preferably carried out under ambient conditions of pressure and humidity. Conditions outside normal atmospheric conditions can be used if desired.

The components of the photothermographic element can be in any location in the element that provides the desired image. If desired, one or more of the components of the element can be distributed between two or more of the layers of the element. For example, in some cases, it is desirable to include certain percentages of the organic reducing agent, toner, stabilizer precursor and/or other addenda in an overcoat layer of the photothermographic element.

It is necessary that the components of the imaging combination be "in association" with each other in order to produce the desired image. The term "in association" herein means that in a photothermographic element the photosensitive silver halide and the image-forming combination are in a location with respect to each other that enables the desired processing and produces a useful image.

The photothermographic elements of this invention are typically provided with an overcoat layer and/or a backing layer, with the overcoat layer being the outermost layer on the side of the support on which the imaging layer is coated and the backing layer being the outermost layer on the opposite side of the support. Other layers which are advantageously incorporated in photothermographic imaging elements include subbing layers and barrier layers.

To be fully acceptable, a protective overcoat layer for such imaging elements should: (a) provide resistance to deformation of the layers of the element during thermal processing, (b) prevent or reduce loss of volatile components in the element during thermal processing, (c) reduce or prevent transfer of essential imaging components from one or more of the layers of the element into the overcoat layer during manufacture of the element or during storage of the element prior to imaging and thermal processing, (d) enable satisfactory adhesion of the overcoat to a contiguous layer of the element, and (e) be free from cracking and undesired marking, such as abrasion marking, during manufacture, storage, and processing of the element.

A backing layer also serves several important functions which improve the overall performance of photothermographic imaging elements. For example, a backing layer serves to improve conveyance, reduce static electricity and eliminate formation of Newton Rings.

A particularly preferred overcoat for photothermographic imaging elements is an overcoat comprising poly(silicic acid) as described in U.S. Pat. No. 4,741,992, issued May 3, 1988. Advantageously, water-soluble hydroxyl-containing monomers or polymers are incorporated in the overcoat layer together with the poly(silicic acid). The combination of poly(silicic acid) and a water-soluble hydroxyl-containing monomer or polymer that is compatible with the poly(silicic acid) is also useful in a backing layer on the side of the support opposite to the imaging layer as described in U.S. Pat. No. 4,828,971, issued May 9, 1989.

U.S. Pat. No. 4,828,971 explains the requirements for backing layers in photothermographic imaging elements. It points out that an optimum backing layer must:

(a) provide adequate conveyance characteristics during manufacturing steps, (b) provide resistance to deformation of the element during thermal processing, (c) enable satisfactory adhesion of the backing layer to the support of the element without undesired removal during thermal processing, (d) be free from cracking and undesired marking, such as abrasion marking during manufacture, storage and processing of the element, (e) reduce static electricity effects during manufacture and (f) not provide undesired sensitometric effects in the element during manufacture, storage or processing.

A wide variety of materials can be used to prepare a backing layer that is compatible with the requirements of photothermographic imaging elements. The backing layer should be transparent and colorless and should not adversely affect sensitometric characteristics of the photothermographic element such as minimum density, maximum density and photographic speed. Preferred backing layers are those comprised of poly(silicic acid) and a water-soluble hydroxyl containing monomer or polymer that is compatible with poly(silicic acid) as described in U.S. Pat. No. 4,828,971. A combination of poly(silicic acid) and poly(vinyl alcohol) is particularly useful. Other useful backing layers include those formed from polymethylmethacrylate, cellulose acetate, crosslinked polyvinyl alcohol, terpolymers of acrylonitrile, vinylidene chloride, and 2-(methacryloyloxy) ethyltrimethylammonium methosulfate, crosslinked gelatin, polyesters and polyurethanes.

In the photothermographic imaging elements of this invention, either organic or inorganic matting agents can be used. Examples of organic matting agents are particles, often in the form of beads, of polymers such as polymeric esters of acrylic and methacrylic acid, e.g., poly(methylmethacrylate), styrene polymers and copolymers, and the like. Examples of inorganic matting agents are particles of glass, silicon dioxide, titanium dioxide, magnesium oxide, aluminum oxide, barium sulfate, calcium carbonate, and the like. Matting agents and the way they are used are further described in U.S. Pat. Nos. 3,411,907 and 3,754,924.

The backing layer preferably has a glass transition temperature (Tg) of greater than 50° C., more preferably greater than 100° C., and a surface roughness such that the Roughness Average (Ra) value is greater than 0.8, more preferably greater than 1.2, and most preferably greater than 1.5.

As described in U.S. Pat. No. 4,828,971, the Roughness Average (Ra) is the arithmetic average of all departures of the roughness profile from the mean line.

The concentration of matting agent required to give the desired roughness depends on the mean diameter of the particles and the amount of binder. Preferred particles are those with a mean diameter of from about 1 to about 15 micrometers, preferably from 2 to 8 micrometers. The matte particles can be usefully employed at a concentration of about 1 to about 100 milligrams per square meter.

As previously described herein, the photothermographic elements of this invention are spectrally sensitized with an anionic cyanine dye comprising two thiazole nuclei each of which is substituted with an N-sulfoalkyl group with the proviso that at least one of the thiazole nuclei is a 5,6-dihalobenzothiazole nucleus.

Examples of anionic cyanine dyes that are usefully employed as spectral sensitizing dyes in the novel photothermographic elements of this invention include the following:

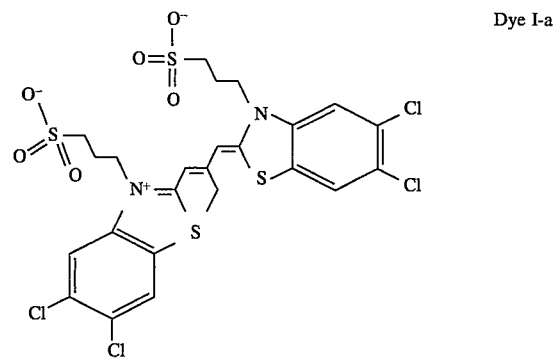

Dye I-a

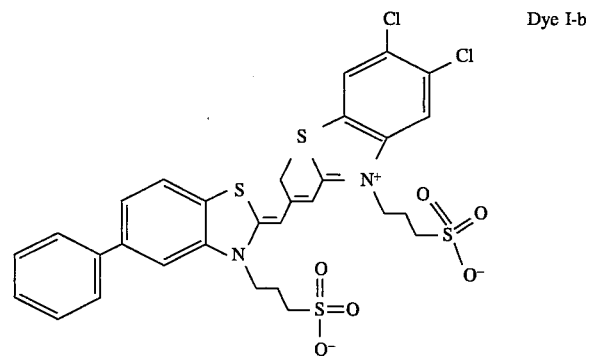

Dye I-b

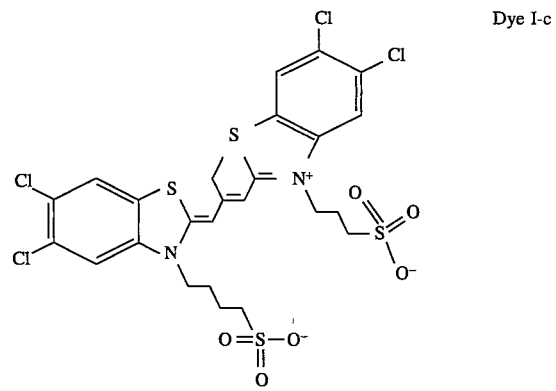

Dye I-c

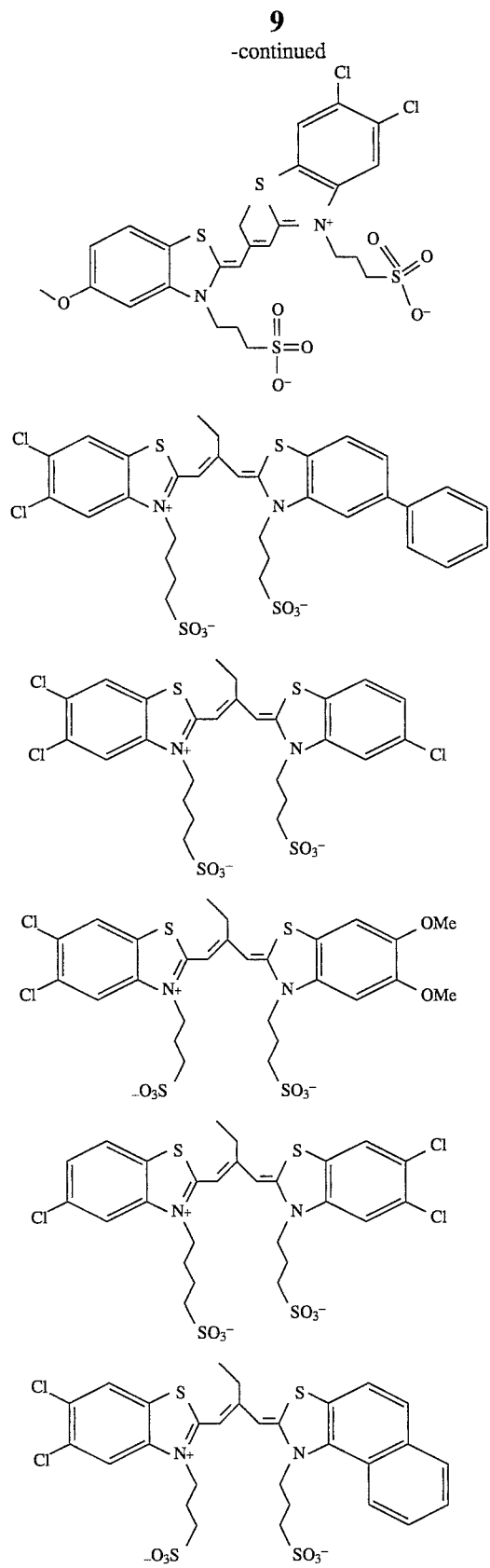
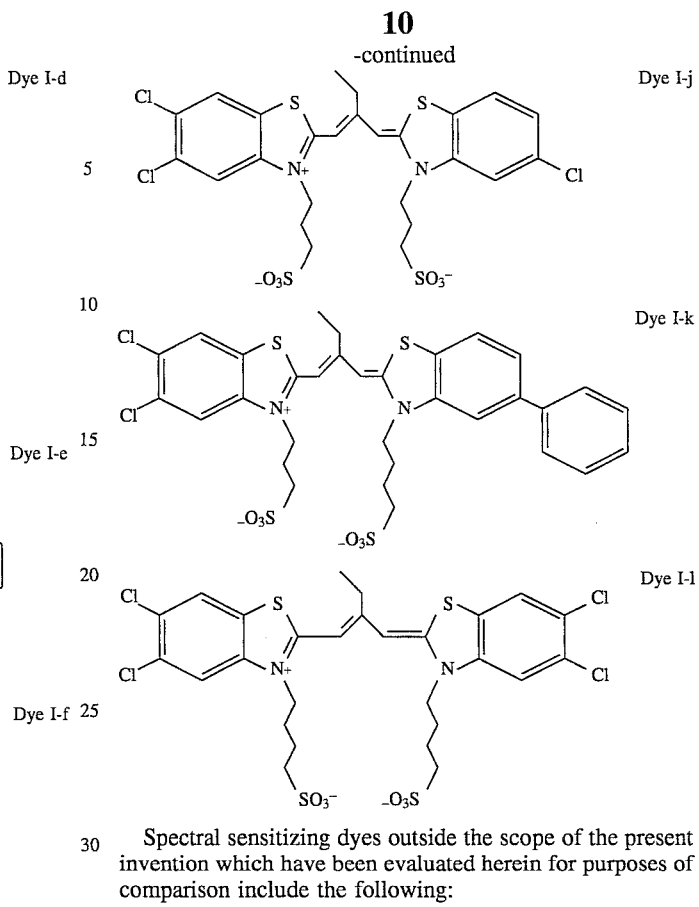
Spectral sensitizing dyes outside the scope of the present invention which have been evaluated herein for purposes of comparison include the following:
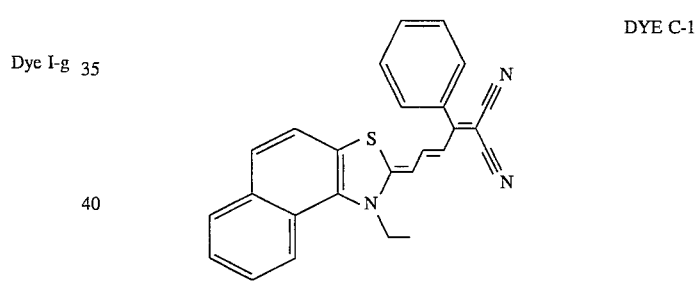
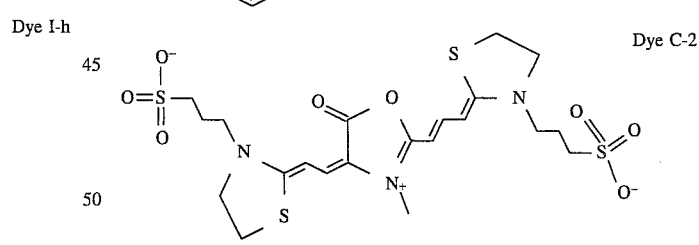
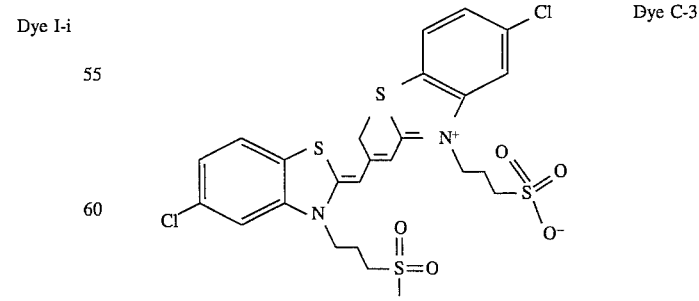

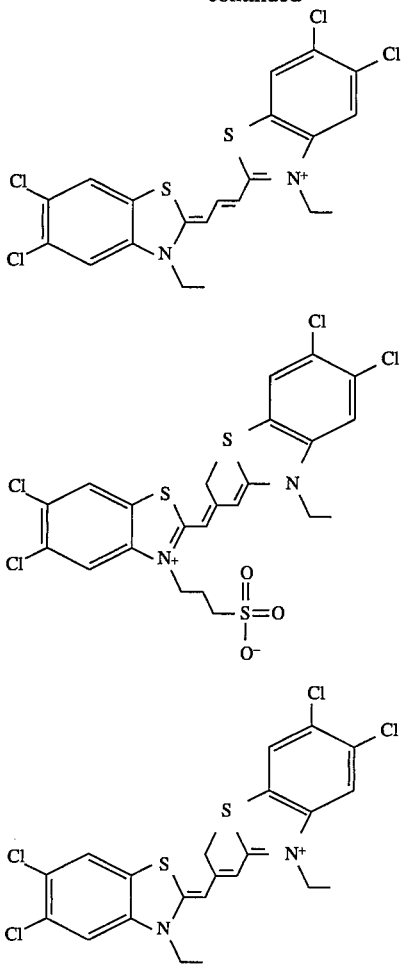

Dye C-4

Dye C-5

Dye C-6

Each of dyes C-1 to C-6 is outside the scope of the present invention. Thus, dye C-1 is a nonionic merocyanine dye; dye C-2 is a complex cyanine; dye C-3 is an anionic cyanine but neither of the thiazole nuclei is substituted in both the five and six positions with a halogen atom; dye C-4 is a cationic cyanine; dye C-5 is a zwitterionic cyanine; and dye C-6 is a cationic cyanine.

The spectral sensitizing dye of this invention can be incorporated in the photothermographic element in any amount that is sufficient to achieve the desired sensitization. Useful amounts are typically in the range of from about 2 to about 12 milligrams of dye per square meter.

The invention is further illustrated by the following examples of its practice. In the examples, the counterions employed were sodium ($Na^+$), $(C_2H_5)_3NH^+$ ($TEA^+$) or para-toluenesulfonate ($PTS^-$) and the quantity of dye employed, including counterion, is reported in milligrams.

EXAMPLE 1 AND COMPARATIVE EXAMPLES A–C

A photothermographic coating composition was prepared in accordance with the following formulation which describes each of the components and the weight of each component employed:

| | |
|---|---|
| silver behenate dispersion in methylisobutylketone (MIBK) (5.0% by weight BUTVAR ® B-76 poly(vinyl-butyral) available from the Monsanto Co., USA, 0.20% by weight sodium iodide, 4.25% by weight Ag, 0.0096% by weight $HgBr_2$) | 38.0g |
| silver bromide emulsion (4.2% by weight Ag as cubic AgBr with 85 nm edgelength in 11% by weight BUTVAR ® B-76 in MIBK) | 15.2g |
| succinamide (10% by weight in 10.5% by weight acetone solution of BUTVAR ® B-76) | 7.0g |
| SF-96 ® (10% by weight in MIBK, SF-96 ® is a silicone surfactant available from General Electric Co., USA) | 0.3g |
| 2-bromo-2-(4-methylphenylsulphonyl) acetamide (2.5% by weight in 10.5% by weight acetone solution of BUTVAR ® B-76) | 4.6g |
| 2,4-bis(trichloromethyl)-6-(1-naphthyl)-s-triazine (2.5% by weight in 10.5% by weight acetone solution of BUTVAR ® B-76) | 1.1g |
| sensitizing dye (0.209 mmol of sensitizing dye in 12.5% by weight phenoxyethanol in acetone solution) | 8.5g |
| benzenesulfonamidophenol (10% by weight in 10.5% by weight acetone solution of BUTVAR ® B-76) | 18.7g |
| MIBK | 6.6g |

Comparative Examples A, B and C were the same as Example 1 except that they used dyes C-1, C-2 and C-3, respectively, in place of dye I-a.

The photothermographic compositions were coated on a poly(ethylene terephthalate) film base at a total laydown of 69 $cc/m^2$ and a silver laydown of 1.34 $g/m^2$ (0.38 $g/m^2$ Ag from AgBr and 0.96 $g/m^2$ Ag from silver behenate). The resulting photothermographic element was overcoated with the following composition at 69 $cc/m^2$.

| Component | Weight |
|---|---|
| Water | 40.82g |
| Aqueous solution of polyvinyl alcohol (8% by wt solids) | 33.40g |
| Polysilicic acid solution | 24.48g |
| Surfactant | 1.00g |
| Matte beads | 0.30g |

The polysilicic acid solution used in the overcoat was prepared by combining 172.8 g of water, 7.2 g of 1 normal p-toluenesulfonic acid and 200 g of methanol, adding thereto 208 g of tetraethylorthosilicate (TEOS) and stirring until cooled to room temperature.

The photothermographic element was slit into strips and the strips were exposed for $10^{-3}$ seconds with an EG&G sensitometer through a step-wedge and through a 633 nm interference filter with a 0–4 density step tablet. The exposed strips were processed at 119° C. for 5 seconds. The silver image densities for the step tablet exposure were measured using a blue filter in a computer densitometer. The results obtained are reported in Table I below. In the table, "λ max" refers to the wavelength of maximum sensitivity and "speed 633 nm" refers to the relative speed of the 633 nm interference filter exposure.

TABLE I

| Example Number | Dye | Counter Ion | Mass (mg) | Speed (633 nm) | λ Max |
|---|---|---|---|---|---|
| 1 | I-a | $TEA^+$ | 14 | 251 | 642 |
| Comparison A | C-1 | — | 8.5 | 214 | 620 |
| Comparison B | C-2 | $Na^+$ | 15 | 217 | 615 |
| Comparison C | C-3 | $TEA^+$ | 16 | 195 | 655 |

As shown by the data in Table I, inventive dye I-a provided significantly higher speed, and thus is a more effective sensitizing dye, than comparative dyes C-1, C-2 and C-3.

EXAMPLES 2 AND 3 AND COMPARATIVE EXAMPLE D

A photothermographic coating composition was prepared in accordance with the following formulation which describes each of the components and the weight of each component employed:

| | |
|---|---|
| silver behenate dispersion in methylisobutylketone (MIBK) (5.0% by weight BUTVAR ® B-76 poly(vinylbutyral) available from the Monsanto Co., USA, 0.20% by weight sodium iodide, 4.25% by weight Ag) | 45.6g |
| silver bromide emulsion (4.2% by weight Ag as cubic AgBr with 71 nm edgelength in 11% by weight BUTVAR ® B-76 in MIBK) | 3.2g |
| succinamide (10% by weight in 10.5% by weight acetone solution of BUTVAR ® B-76) | 4.2g |
| SF-96 ® (10% by weight in MIBK, SF-96 ® is a silicone surfactant available from General Electric Co., USA) | 0.1g |
| 2-bromo-2-(4-methylphenylsulphonyl) acetamide (2.5% by weight in 10.5% by weight acetone solution of BUTVAR ® B-76) | 4.6g |
| 2,4-bis(trichloromethyl)-6-(1-naphthyl)-s-triazine (2.5% by weight in 10.5% by weight acetone solution of BUTVAR ® B-76) | 1.1g |
| sensitizing dye (0.064 mmol of sensitizing dye in 12.5% by weight phenoxyethanol in acetone solution) | 2.6g |
| benzenesulfonamidophenol (10% by weight in 10.5% by weight acetone solution of BUTVAR ® B-76) | 26.2g |
| palmitic acid (10% by weight in 10.5% by weight acetone solution of BUTVAR ® B-76) | 1.4g |
| MIBK | 12.5g |

Photothermographic elements were prepared and processed in the same manner as described in Example 1. Keeping stability was measured for strips aged 2 weeks at 50° C. and 15% relative humidity and is reported in terms of speed change. The results obtained are reported in Table II below.

TABLE II

| Example Number | Dye | Counter Ion | Mass (mg) | Speed (633 nm) | λ Max | Keeping Stability (50° C., 15% RH) |
|---|---|---|---|---|---|---|
| 2 | I-a | TEA$^+$ | 5 | 292 | 642 | +5 |
| 3 | I-b | TEA$^+$ | 5 | 308 | 634 | −9 |
| Comparison D | C-1 | — | 2.6 | 226 | 620 | −28 |

As shown by the data in Table II, inventive dyes I-a and I-b provided significantly higher speed and better keeping stability than comparative dye C-1.

EXAMPLES 4–6 AND COMPARATIVE EXAMPLE E

A photothermographic coating composition was prepared in accordance with the following formulation which describes each of the components and the weight of each component employed:

| | |
|---|---|
| silver behenate dispersion in methylisobutylketone (MIBK) (5.0% by weight BUTVAR ® B-76 poly(vinylbutyral) available from the Monsanto Co., USA, 0.20% by weight sodium iodide, 4.25% by weight Ag) | 45.8 g |
| silver bromide emulsion (4.2% by weight Ag as cubic AgBr with 61 nm edgelength in 11% by weight BUTVAR ® B-76 in MIBK) | 2.96g |
| succinamide (10% by weight in 10.5% by weight acetone solution of BUTVAR ® B-76) | 4.2 g |
| SF-96 ® (10% by weight in MIBK, SF-96 ® is a silicone surfactant available from General Electric Co., USA) | 0.1 g |
| 2-bromo-2-(4-methylphenylsulphonyl) acetamide (2.5% by weight in 10.5% by weight acetone solution of BUTVAR ® B-76) | 4.6g |
| 2,4-bis(trichloromethyl)-6-(1-naphthyl)-s-triazine (2.5% by weight in 10.5% by weight acetone solution of BUTVAR ® B-76) | 1.1g |
| sensitizing dye (0.064 mmol of sensitizing dye in 12.5% by weight phenoxyethanol in acetone solution) | 2.6g |
| benzenesulfonamidophenol (10% by weight in 10.5% by weight acetone solution of BUTVAR ® B-76) | 26.1g |
| palmitic acid (10% by weight in 10.5% by weight acetone solution of BUTVAR ® B-76) | 1.4g |
| MIBK | 11.0g |

Photothermographic elements were prepared and processed in the same manner as described in Example 1. Keeping stability was determined for strips aged four weeks at ambient conditions. The results obtained are reported in Table III below.

TABLE III

| Example Number | Dye | Counter Ion | Mass (mg) | Speed (633 nm) | λ Max | Keeping Stability Ambient |
|---|---|---|---|---|---|---|
| 4 | I-a | TEA$^+$ | 5 | 194 | 642 | +1 |
| 5 | I-b | TEA$^+$ | 5 | 233 | 634 | +18 |
| 6 | I-c | TEA$^+$ | 5 | 245 | 634 | +18 |
| Comparison E | C-1 | — | 2.6 | 145 | 620 | −27 |

As shown by the data in Table III, inventive dyes I-a, I-b and I-c provided significantly higher speed and better keeping stability than comparative dye C-1.

EXAMPLE 7 AND COMPARATIVE EXAMPLES F–H

A photothermographic coating composition was prepared in accordance with the following formulation which describes each of the components and the weight of each component employed.

| | |
|---|---|
| silver behenate dispersion in methylisobutylketone (MIBK) (5.0% by weight BUTVAR ® B-76 poly(vinylbutyral) available from the Monsanto Co., USA, 0.20% by weight sodium iodide, 4.25% by weight Ag) | 34.5 g |
| silver bromide emulsion (4.2% by weight Ag as cubic AgBr with 85 nm edgelength in 11% by weight BUTVAR ® B-76 in MIBK) | 4.9 g |
| succinamide (10% by weight in 10.5% by weight acetone solution of BUTVAR ® B-76) | 4.2 g |
| SF-96 ® (10% by weight in MIBK, SF-96 ® is a silicone surfactant available from General Electric Co., USA) | 0.3 g |
| 2-bromo-2-(4-methylphenylsulphonyl) acetamide (2.5% by weight in 10.5% by weight acetone solution of BUTVAR ® B-76) | 4.6 g |
| 2,4-bis(trichloromethyl)-6-(1-naphthyl)-s-triazine (2.5% by weight in 10.5% by weight acetone solution of BUTVAR ® B-76) | 1.1 g |
| sensitizing dye (0.107 mmol of sensitizing dye in 12.5% by weight phenoxyethanol in acetone solution) | 4.35g |
| benzenesulfonamidophenol (10% by weight in 10.5% by weight acetone solution of BUTVAR ® B-76) | 26.1 g |
| palmitic acid (10% by weight in 10.5% by weight acetone solution of BUTVAR ® B-76) | 1.4 g |
| MIBK | 18.5 g |

Photothermographic elements were prepared and processed in the same manner as described in Example 1 except that exposure was through a Wratten 29 filter with a 0–4 density step tablet. The results obtained are reported in Table IV below.

TABLE IV

| Example Number | Dye | Counter Ion | Mass (mg) | Speed (633 nm) | λ Max |
|---|---|---|---|---|---|
| 7 | I-a | TEA+ | 8.7 | 305 | 642 |
| Comparison F | C-4 | PTS- | 6.5 | 192 | 600 |
| Comparison G | C-5 | — | 6.5 | <150 | 600 |
| Comparison H | C-6 | PTS- | 8.7 | <150 | 600 |

As shown by the data in Table IV, inventive dye I-a is a more effective sensitizing dye at 633 nm than comparative dyes C-4, C-5 and C-6.

The advantages of this invention in terms of low stain, excellent stability and effective spectral sensitization, especially for exposure at 633 nm, provide a solution to performance deficiencies which have long hindered the commercial utilization of photothermographic elements. The invention facilitates the use of fine grain silver halides so as to minimize problems of light scattering and resulting excessive values of Dmin. Sensitivity to 633 nm light from a HeNe laser or solid state laser makes it feasible to use these highly advantageous exposure sources in imaging of photothermographic elements.

The invention has been described in detail, with particular reference to certain preferred embodiments thereof, but it should be understood that variations and modifications can be effected within the spirit and scope of the invention.

What is claimed is:

1. A photothermographic element comprised of a support bearing one or more layers comprising:

(a) a photosensitive silver halide, prepared in situ or ex situ, (b) an organic silver salt; and (c) a reducing agent;

in concentrations such that imagewise exposure to actinic radiation generates from the silver halide a catalyst which accelerates an image-forming reaction between the organic silver salt and the reducing agent; wherein the photosensitive silver halide is spectrally sensitized with an anionic cyanine dye comprising two thiazole nuclei each of which is substituted with an N-sulfoalkyl group, with the proviso that at least one of said thiazole nuclei is a 5,6-dihalobenzothiazole nucleus.

2. A photothermographic element as claimed in claim 1, wherein each of said thiazole nuclei is a benzothiazole nucleus.

3. A photothermographic element as claimed in claim 1, wherein each of said N-sulfoalkyl groups contains 2 to 6 carbon atoms.

4. A photothermographic element as claimed in claim 1, wherein at least one of said thiazole nuclei is a 5,6-dichlorobenzothiazole nucleus.

5. A photothermographic element as claimed in claim 1, wherein said anionic cyanine dye is represented by the formula:

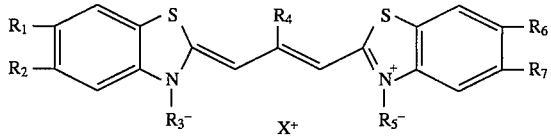

wherein:

$R_1$, $R_2$, $R_6$ and $R_7$ are, independently, hydrogen, halo, alkyl, alkoxy, aryl, aryloxy, heteroaryl, cyano, carboxy or hydroxy;

$R_3^-$ and $R_5^-$ are, independently, sulfoalkyl of 2 to 6 carbon atoms;

$R_4$ is hydrogen or alkyl of 1 to 4 carbon atoms; and $X^+$ is a positive counterion; with the proviso that at least one of the benzothiazole nuclei is a 5,6-dihalobenzothiazole nucleus.

6. A photothermographic element as claimed in claim 5, wherein each of $R_1$, $R_2$, $R_6$, and $R_7$ is chloro.

7. A photothermographic element as claimed in claim 5, wherein $X^+$ is $Na^+$, $K^+$, $(C_2H_5)_3NH^+$, or the tetramethylguanadinium ion.

8. A photothermographic element as claimed in claim 1, wherein said anionic cyanine dye is represented by the formula:

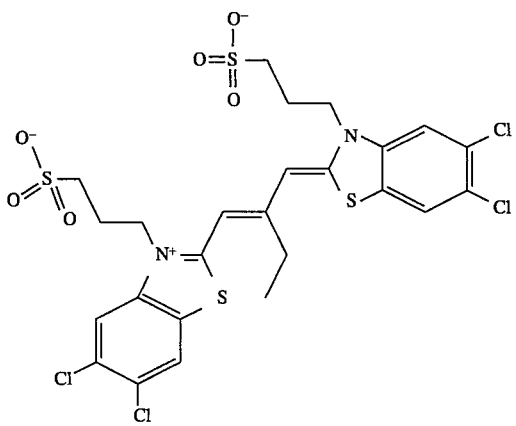

9. A photothermographic element as claimed in claim 1, wherein said anionic cyanine dye is represented by the formula:

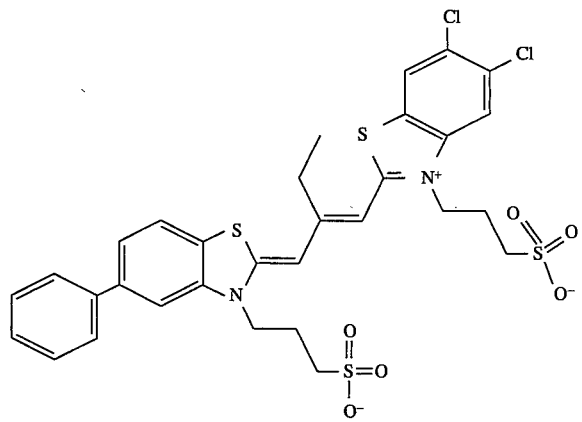

10. A photothermographic element as claimed in claim 1, wherein said anionic cyanine dye is represented by the formula:

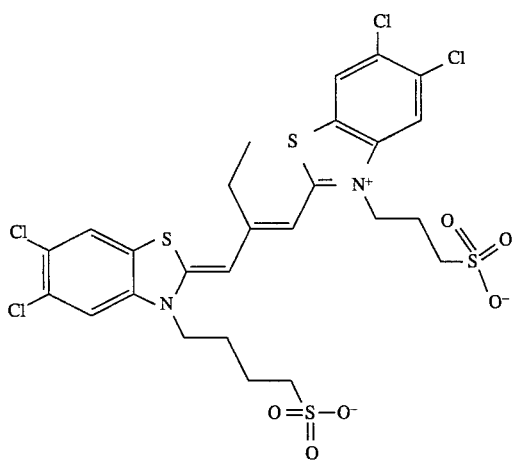

11. A photothermographic element as claimed in claim 1, wherein said anionic cyanine dye is represented by the formula:

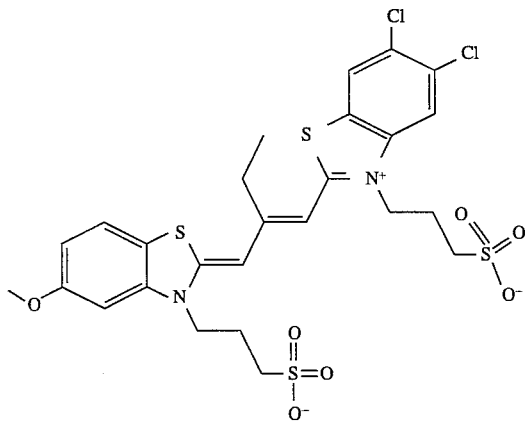

12. A photothermographic element as claimed in claim 1, wherein said photosensitive silver halide comprises silver chloride, silver bromide, silver bromoiodide, silver chlorobromoiodide or a mixture thereof.

13. A photothermographic element as claimed in claim 1, wherein said organic silver salt is a silver salt of a long chain fatty acid.

14. A photothermographic element as claimed in claim 1, wherein said organic silver salt is silver behenate.

15. A photothermographic element as claimed in claim 1, wherein said reducing agent is a phenolic reducing agent.

16. A photothermographic element as claimed in claim 1, wherein said reducing agent is benzenesulfonamidophenol.

17. A photothermographic element as claimed in claim 1 additionally comprising a toning agent and an image stabilizer.

18. A photothermographic element as claimed in claim 1, wherein said photosensitive silver halide, organic silver salt and reducing agent are dispersed in a poly(vinyl butyral) binder.

* * * * *